Figure 1:
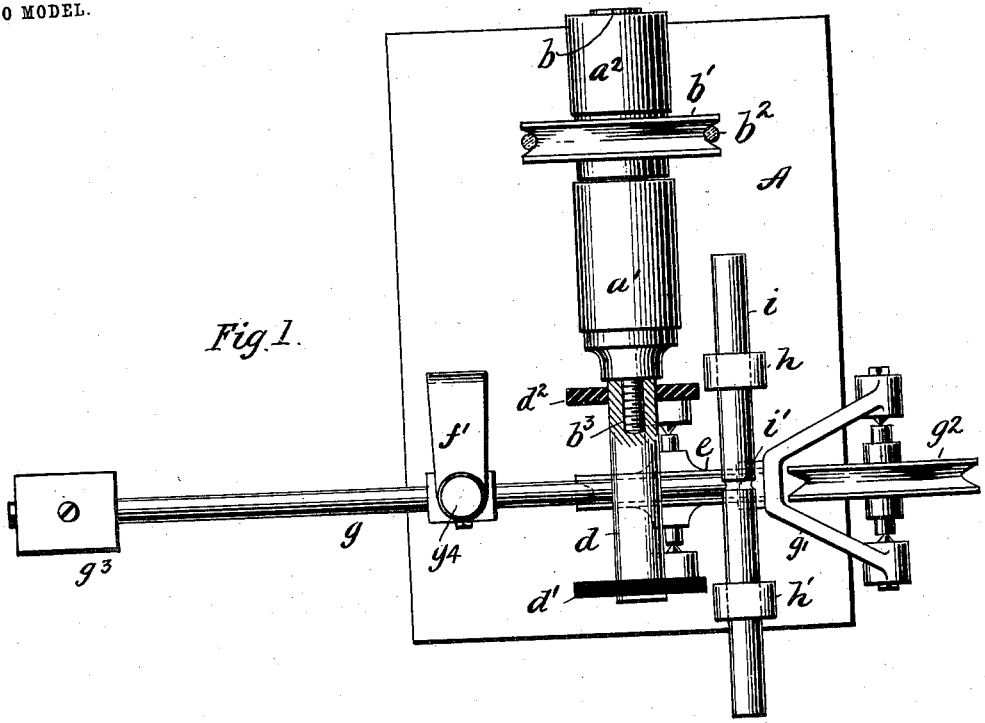

No. 736,472. PATENTED AUG. 18, 1903.
C. ANDERSON.
WINDING MACHINE.
APPLICATION FILED APR. 10, 1903.
NO MODEL. 2 SHEETS—SHEET 1.

Witnesses
Inventor
Charles Anderson
By his Attorney

No. 736,472. PATENTED AUG. 18, 1903.
C. ANDERSON.
WINDING MACHINE.
APPLICATION FILED APR. 10, 1903.
NO MODEL. 2 SHEETS—SHEET 2.

No. 736,472.

Patented August 18, 1903.

UNITED STATES PATENT OFFICE.

CHARLES ANDERSON, OF NEW YORK, N. Y., ASSIGNOR TO JAMES C. ANDERSON, OF JERSEY CITY, NEW JERSEY.

WINDING-MACHINE.

SPECIFICATION forming part of Letters Patent No. 736,472, dated August 18, 1903.

Application filed April 10, 1903. Serial No. 151,971. (No model.)

*To all whom it may concern:*

Be it known that I, CHARLES ANDERSON, a citizen of the United States, residing at the city of New York, in the borough of Brooklyn and State of New York, have invented certain new and useful Improvements in Winding-Machines, of which the following is a full, clear, and exact description.

This invention is a machine especially adapted for the winding of insulated wire into coils for electromagnetic and other electric purposes, the object being to provide a mechanism which will automatically wind the successive convolutions of a layer closely together, so that each layer will form a solid basis upon which to wind the next succeeding layer, and thus produce a coil whose convolutions are uniformly placed throughout and the total number of convolutions of a given size of wire in a given cubical winding space will always be the same. It has been difficult heretofore to do this work by a machine on account of the irregularities occurring in the wire itself, such irregularities consisting of imperfectly-applied insulation and kinks in the wire which are not compensated for by such strand-guides as have been used to direct the wire to the winding-spindle in machines heretofore devised. My improved machine is so constructed that the guide for the strand automatically compensates for these defects in the wire, the guide being moved by the tension of the strand itself instead of by any positive means and the stresses influencing the guide being so arranged as to act against each other to produce a balance, with the result that the guide is at any given instant in a condition of stable equilibrium. I accomplish this by providing that the guide shall be movable along a curved path, that the limbs of the strand leading, respectively, to and from the guide shall be angularly displaced from each other, the limb leading to the winding-spindle being always normal to the axis thereof and the center of the curve along which the guide is movable being in a line bisecting the angle between the respective limbs of the strand. In such an arrangement the guide is in a floating condition and any irregularities in the wire which ordinarily would bring an unbalancing strain upon the guide are automatical and at once compensated for by an extra or unusual movement of the guide. The force which normally moves the guide along its curved path is the action of the last convolution wound against the lead of the wire, the guide being dragged along, as it were, and the lead, instead of being absolutely normal to the axis of rotation, has a slight backward incline, which is useful in the winding of the coil because it places each convolution closely against the last and insures a solid layer. This being an important requirement, I have provided, and my invention includes, an adjustable device by which the extent of the drag or incline of the lead can be predetermined or altered at any time during the course of the winding. Machines of this character which are used for winding the finest wires—those, for instance, a few thousandths of an inch in diameter—are necessarily sensitive to extraneous influences, and when operating in a shop or on a bench with other machinery, where they are subjected to vibrations or shocks, there is danger of the guide becoming unbalanced and misplacing the convolutions unless means are provided to prevent such result. In the design of my machine I have mounted the guide upon one end of an arm which is pivoted at an intermediate point of its length and in which the weight of said arm is distributed upon each side of the pivot in such a manner that its center of gravity and its center of gyration are coincident with its axis and the axis is mounted in the main frame of the machine. By this arrangement all shocks delivered to the arm carrying the guide are distributed equally throughout its length and result in no movement of the arm or guide which is not partaken of also by the other members of the machine. So long as such shocks do not cause the guide to move relatively to the other parts of the machine they do not disturb the winding operation.

Incidentally my invention also includes a straightening device which removes the slight kinks or bends commonly found in the wire. This is located between the guide referred to and the winding-spindle and in a supplemental way, as will be hereinafter explained, also influences the drag as well as the reversing of the traverse at the ends of the layers.

A fuller explanation of the machine and its operation will be given with reference to the accompanying drawings, in which—

Figure 2:
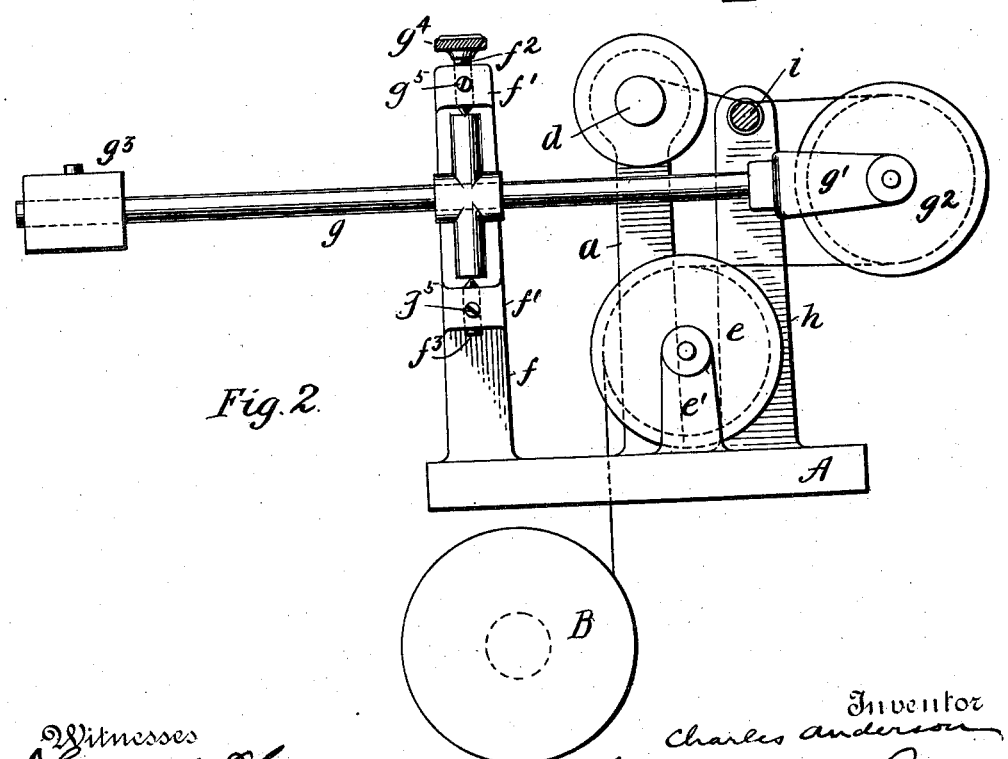
Figure 3:
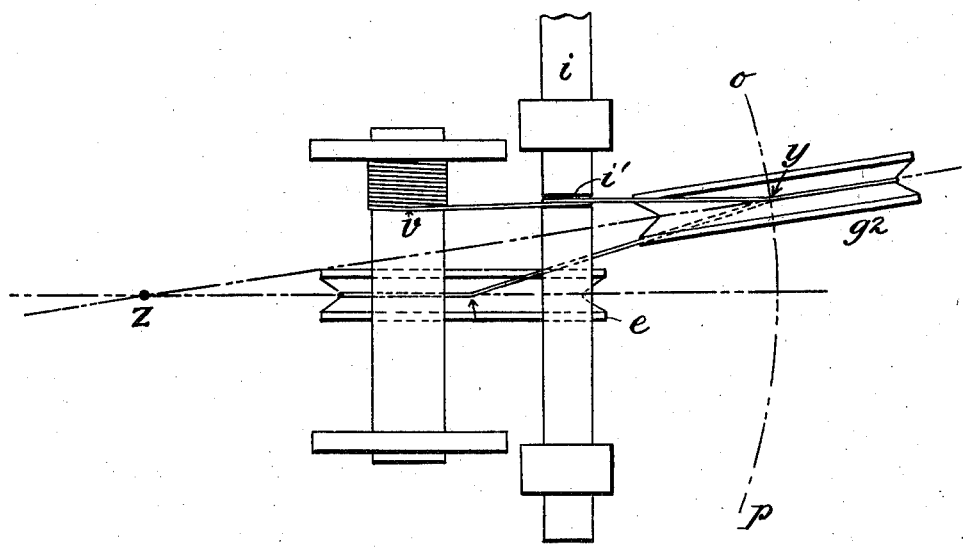
Figure 4:
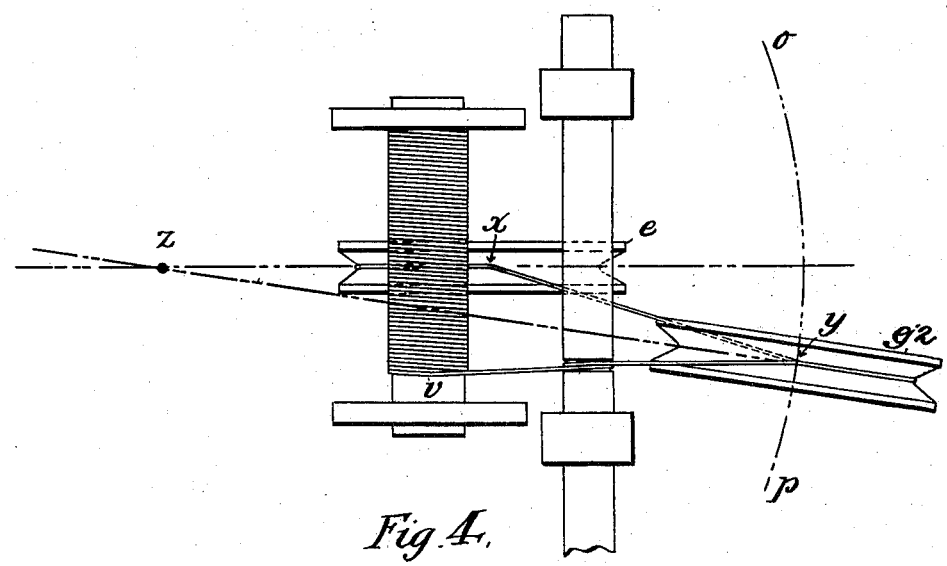

Figure 1 is a plan of the machine with parts in section. Fig. 2 is an end elevation of the machine, and Figs. 3 and 4 are diagrammatic plans illustrating the operation.

Referring to the drawings by letter, A indicates a base upon which all parts of the machine are mounted.

$a$ indicates a standard preferably cast with the base and having two bearings or boxes $a'$ and $a^2$ at its upper end, in which is a shaft or spindle $b$, having a pulley $b'$, by which it is driven from any suitable source of power through a belt $b^2$. One end of this spindle carries a head-stock which in the present instance is a screw $b^3$, upon which the spool whereon the winding is to be done is screwed. This spool, as shown, is an ordinary magnet-spool consisting of an iron core $d$, having two heads $d'$ and $d^2$, between which the wire is to be wound. The end of the core is drilled and tapped to fit the screw $b^3$.

$e$ is a guide-sheave having a V-shaped grooved periphery. Its axis is parallel to and below the axis of the winding-spool. It is mounted in solid standards $e'$. $f$ is another solid standard having two brackets $f'$ pierced vertically by screws $f^2$ and $f^3$, respectively, whose ends are pointed to form pivotal points for an arm $g$. This arm is thus pivoted upon a vertical axis and in delicate bearings to provide for the freest possible turning. The arm projects between the axis of the spindle and the axis of the sheave $e$ and reaches considerably beyond the latter, and the diameter of sheave $g^2$ is such that tangents drawn from the fixed guide-sheave to the movable guide-sheave and from the movable guide-sheave to the winding-spindle will be substantially parallel. Arm $g$ extends rearward a suitable distance and is there provided with an adjustable counterweight $g^3$ of such form and size that by properly locating it the center of gyration, as well as the center of gravity of the entire arm, can be made coincident with the pivotal axis of the arm, so that said arm will be absolutely stable, or in equilibrium, at all positions. Means are provided for determining the freedom of swing of the arm upon its axis, the same consisting of a milled head $g^4$ on the end of pivot-screw $f^2$, by which the friction on the pivot can be altered. The set-screws $g^5$ are used to maintain the pivot-screws wherever set. $h$ and $h'$ are two other standards rising from the base A and provided at their upper ends with bearings which receive a rod $i$, adapted to both slide and rotate in said bearings. This rod is provided at its middle point with a V-shaped groove $i'$ for a purpose which will hereinafter appear, and the rod, as shown, is located between the movable guide-sheave $g^2$ and the winding-spindle.

Below the base A is suitably mounted a reel B, containing the material to be wound onto the winding-spindle. In this instance it will be understood to be insulated wire. This reel may be provided with suitable tension devices, and as a modification the reel may represent a guide-sheave for directing the wire vertically to the fixed sheave $e$ from a reel located at any other point.

Further features of construction will be explained in the description of the operation which follows. The insulated wire leading from reel B passes through a hole in the base A in a vertical direction and leads around the fixed pulley $e$, covering substantially ninety degrees of its periphery and leaving the same in a line substantially tangent at its vertical diameter. It passes thence around the outer half of the movable guide-sheave $g^2$, leaving said guide-sheave at a point substantially tangent thereto and vertically above the point where it entered. The strand thence leads around the groove $i'$ in rod $i$ one or more times, once around being ordinarily sufficient, and finally to the winding-spool, where the end is secured in any suitable way. In order to understand the operation the two guide-sheaves should be considered as guiding points or eyes, the tangent point at the upper side of the guide-sheave $e$ being regarded as a fixed point, since it does not alter its position in space, while the vertical line connecting the two tangent points on the movable sheave $g^2$ may be considered as a movable guide-point, since it swings around the axis of the arm. In Figs. 3 and 4 these guide-points are respectively indicated by $x$ and $y$. In the same figures $z$ indicates the pivotal point of the arm, and $o\ p$ the curved path through which the point $y$ swings. $z$ and $x$ are in a line with each other normal to the axis of the winding-spindle and preferably midway between the heads of the spool to be wound. The length of $x\ y$ is so proportioned to the length of $z\ y$ that a line $y\ v$ drawn to the winding-axis at the same angular displacement from $y\ z$ as $y\ x$ will be normal to the winding-axis. This is the correct position for $y\ z$ or the lead, except for such distortion or drag as is desirable in order to lay the convolutions close together. It is obvious that with this training of the strand and with a certain tension at B the strains in strands $x\ y$ and $y\ v$ will be equal and that the resultant of those strains will be in the line $y\ z$ coincident with the arm. Hence in resisting or supporting the two strains there is no tendency of the arm to move on its pivot, but the arm is always in a condition to at once respond to any variation of either strain. Now so long as the wire continues to be free of kinks and its insulation smooth the winding will continue uninterruptedly and the movement of the point $y$ along its curved path will be uniform.

We will now consider the actual conditions in winding. In order to lay the convolutions close together, the strand $y\ v$ is allowed a slight backward lead sufficient to cause the lead to rub against the last convolution without mounting it, and this rubbing action of the convolution against the lead is relied upon to move the point $y$, it being understood that any change of the angle $v\,y\,z$ with respect to $x\,y\,z$ will result in a movement of $y$. The backward lead of the strand can be adjusted to any extent to conform to the size and stiffness of the wire by turning the screw $g^4$, which will increase or decrease the friction at the pivot of the arm, an increase of friction giving a greater incline of the lead from the normal. At the end of the traverse on one layer the inertia of the mass on which point $y$ is located carries it beyond the plane of the last convolution and at once determines the incline of the lead for the traverse in the opposite direction. The point $y$ being thus in a "floating" condition and extremely sensitive to the two strains acting upon it will readily compensate for variations due to knots or enlargement in the insulation of the wire. If, for instance, a knot has been laid in a convolution, it will be seen that the lead in rubbing against it on the next turn of the spindle will for an instant be put under abnormal strain, and point $y$, then being thrown out of balance, will at once be accelerated and prevent the lead from mounting the knot, as well as relieving the strand from excessive strain. A kink in the wire which produces a similar irregularity in the convolution would act and be taken care of in the same way. Obviously a positively-moved guide-point $y$, or one which does not equally resist the strains, would not yield to the extra strain caused by a knot or kink, and this accounts, to a great extent, for the repeated stoppages necessary in machines heretofore invented for automatic winding in order to adjust misplaced convolutions and which has rendered those machines impracticable for winding fine insulated wire into electric coils.

Kinks in the wire which tend to leave open spaces between the convolutions are undesirable, and I have therefore provided a straightening device to remove them as much as possible. The lead $y\,v$ makes one turn around the rod $i$, the turn being in groove $i'$ to hold the crossing strands against each other. In this way the kinks are rubbed out to a great extent. This device is preferably located between points $y$ and $v$, because the weight of the rod serves a further useful purpose in furnishing a drag for the lead. The rod is free to both slide and rotate in its bearings, and at the end of a layer its inertia is added to that of the arm $g$ to reverse the direction of the lead for the return traverse. Utilizing this rod in this way also makes it possible to use less friction at the pivot of the arm $g$, making the latter more sensitive to the strains.

Since the point $y$ moves in the arc of a circle, it is evident that it may be mounted upon a curved track whose center is at $z$. The line $o\,p$ may indicate such a track, which may be merely a curved rod upon which the sheave $g^2$ slides as well as turns. Hence my invention is not limited to a pivoted arm, although for practical reasons it is preferred. As a matter of fact, the theoretically-correct shape for the curved path of point $y$ is parabolic, $x$ being the focus, $z$ the subfocus, and all positions of $y\,v$ being parallel to each other; but since the length of the spool to be wound covers only that portion of the parabola immediately back of the focus, which is nearly circular, a true circular path is found to be sufficiently accurate for the point $y$.

In the winding of the most delicate wire shocks and vibrations that may be delivered to the strand-guides and do not affect the winding-spindle are very liable to cause a parting of the strand or to misplace the convolutions. As my floating guide $y$ or $g$ is delicately mounted, it is necessary to arrange it so that it will not partake of any movements which are not shared by the other parts of the machine. If, for instance, the center of gyration and the center of gravity of the arm were not coincident with the axis, any lateral shock would tend to make the arm turn on its axis; but with the arm perfectly balanced, as it is, rotary movement from this cause is prevented, and such bodily movement as it partakes of extends to the remainder of the machine and no relative displacement of the parts takes place.

Having described my invention, I claim—

1. In a machine for winding strands into coils, the combination of a winding-spindle, a guide for the strand, said guide being movable along a curved path whose center is in a line bisecting the angle between the limbs of the strand each side of the guide.

2. In a machine for winding strands into coils, the combination of a winding-spindle, a movable guide and a fixed guide for the strand, and means whereby the movable guide is caused to travel in a curved path whose center is in a line bisecting the angle formed by a line drawn from the movable guide normal to the winding-spindle and a line from the movable to the fixed guide.

3. In a machine for winding strands into coils, the combination of a winding-spindle, a guide for the strand, said guide being movable along a curved path whose center is in a line bisecting the angle between the limbs of the strand each side of the guide, and means whereby differences of strain in the two limbs will cause the movable guide to move.

4. In a machine for winding strands into coils, the combination of a winding-spindle, a guide for the strand, a pivoted arm carrying said guide, another guide for the strand and means whereby the arm always tends to assume a position bisecting the angle between the limbs of the strand on each side of the first-mentioned guide.

5. In a machine for winding strands into coils, the combination of a winding-spindle, a guide for the strand, a pivoted arm carrying said guide, means for regulating the freedom of movement of said arm, another guide for the strand and means whereby the arm always tends to assume a position bisecting the angle between the limbs of the strand on each side of the first-mentioned guide.

6. In a winding-machine adapted to wind wire, the combination of a winding-spindle, a guide directing the lead of the wire thereto and a wire-straightening device located between the spindle and guide and free to be moved laterally by the action of the lead upon it.

7. In a winding-machine adapted to wind wire, the combination of a winding-spindle, a movable guide directing the lead of the wire thereto and a rotating and sliding body around which the wire makes one complete turn on its way to the spindle.

8. In a winding-machine adapted to wind wire, the combination of a winding-spindle, a movable guide directing the lead of the wire thereto and a rotating and sliding rod provided with an annular groove around which the wire makes one complete turn on its way to the spindle.

9. In a machine for winding strands into coils, a pivoted arm carrying a guide for the strand, the center of gyration, center of gravity and pivotal center being coincident, for the purpose set forth.

In witness whereof I subscribe my signature in presence of two witnesses.

CHARLES ANDERSON.

Witnesses:
FRANK S. OBER,
WALDO M. CHAPIN.